United States Patent
Connors

(10) Patent No.: US 11,142,264 B2
(45) Date of Patent: Oct. 12, 2021

(54) DRAFT TURBULENCE REDUCTION SYSTEM AND METHOD

(71) Applicant: David Connors, Westerville, OH (US)

(72) Inventor: David Connors, Westerville, OH (US)

(*) Notice: Subject to any disclaimer, the term of this patent is extended or adjusted under 35 U.S.C. 154(b) by 0 days.

(21) Appl. No.: 15/357,453

(22) Filed: Nov. 21, 2016

(65) Prior Publication Data

US 2017/0183043 A1    Jun. 29, 2017

Related U.S. Application Data

(60) Provisional application No. 62/257,851, filed on Nov. 20, 2015.

(51) Int. Cl.
*B62D 35/00* (2006.01)
*F15D 1/10* (2006.01)
*F15D 1/00* (2006.01)

(52) U.S. Cl.
CPC ......... *B62D 35/001* (2013.01); *F15D 1/0055* (2013.01); *F15D 1/10* (2013.01)

(58) Field of Classification Search
CPC .... B62D 35/001; B62D 35/02; B62D 35/007; B62D 35/004; B62D 25/168; B62D 21/20; F15D 1/00; F15D 1/008
USPC .......... 296/180.4, 180.1, 180.5, 81.5, 24.35; 156/244.11, 289, 306.6; 442/382, 383, 442/394, 395, 398
See application file for complete search history.

(56) References Cited

U.S. PATENT DOCUMENTS

| | | | | |
|---|---|---|---|---|
| 2,514,695 A * | 7/1950 | Dempsey | ............. | B62D 35/001 296/208 |
| 4,022,508 A * | 5/1977 | Kirsch | ................... | B62D 35/00 296/180.4 |
| 4,460,055 A * | 7/1984 | Steiner | ................... | B62D 35/00 180/7.1 |
| 5,265,435 A * | 11/1993 | Richardson | .......... | B60H 1/3222 62/133 |
| 7,992,666 B2 * | 8/2011 | Otterstrom | ........... | B62D 35/001 180/69.6 |
| 8,123,281 B2 * | 2/2012 | Perkins | ................ | B62D 35/001 296/180.2 |
| 8,777,297 B2 * | 7/2014 | Meredith | ............. | B62D 35/001 296/180.4 |
| 9,145,177 B2 * | 9/2015 | Smith | .................. | B62D 35/004 |
| 9,248,873 B2 * | 2/2016 | Alguera Gallego | . | B62D 35/001 |
| 2006/0060401 A1 * | 3/2006 | Bole | .................... | B62D 35/001 180/68.1 |
| 2013/0158828 A1 * | 6/2013 | McAlister | ................ | C01B 3/24 701/70 |
| 2015/0035312 A1 * | 2/2015 | Grandominico | ..... | B62D 35/007 296/180.4 |
| 2016/0016616 A1 * | 1/2016 | Bacon | ................. | B62D 35/001 296/180.4 |

(Continued)

*Primary Examiner* — D Glenn Dayoan
*Assistant Examiner* — Sunsurraye Westbrook
(74) *Attorney, Agent, or Firm* — Standley Law Group LLP; Stephen L. Grant

(57) ABSTRACT

The present invention is a system and method for reducing the amount of drag experiences by a moving vehicle as the result of primary airflow across vehicle body edges by introducing a secondary airflow at said edge to reduce the negative pressure created by such an edge such that the turbulence caused by the primary airflow is prevented or reduced.

17 Claims, 5 Drawing Sheets

(56) References Cited

U.S. PATENT DOCUMENTS

2016/0185400 A1\* 6/2016 Martinus ............ B60H 1/00014
296/24.35

\* cited by examiner

DRAFT TURBULENCE REDUCTION SYSTEM AND METHOD

CROSS-REFERENCE TO RELATED APPLICATION

This application claims priority to provisional application 62/257,851 filed on Nov. 20, 2015 and is incorporated by reference in its entirety as if fully recited herein.

TECHNICAL FIELD

Exemplary embodiments of the present invention relate generally to devices for reducing the drag on moving vehicles by introducing a controlled airflow to areas of turbulence.

BACKGROUND AND SUMMARY OF THE INVENTION

As a vehicle moves through the air, a series of disturbances may be generated around and behind the vehicle. These disturbances, generally turbulences and eddies introduced by various components of the vehicle, generate resistance to the vehicle's movement through the air. Additional motive power is required to overcome this resistance which results in higher drag and lower fuel economy than could be achieved without the resistance caused by turbulence. Improved fuel economy is particularly important in circumstances in which a vehicle travels significant distances such as delivery vehicles and over the road trucks. Because of the cargo carrying requirements of such vehicles, they are frequently large and may have a great deal of flat surface area. Such designs are not ideal when considered in light of drag introduced by turbulence. Various methods of applying cowlings to the front and rear of such vehicles has been attempted, sometimes with reasonable improvements in fuel economy. Unfortunately, such devices, especially those located at the rear of such vehicles are unwieldy and may restrict access to the cargo areas of such vehicles. What is needed is a system and method for reducing drag caused by turbulence that does not require an unwieldy additional structure be added to a vehicle.

In an embodiment of the invention, a source of airflow may be directed such that it exits an airflow channel at a location near a trailing edge of a vehicle. In such an embodiment, a series of airflow exit channels may be positioned along the trailing edge of a vehicle. In certain embodiments, the exit channels may be configured to mimic the shape of the trailing edge. In order to optimize the effect of an embodiment of the invention, such an embodiment may adjust the amount of airflow exiting the exit channels according to the speed of the air passing over the vehicle. In order to provide such an adjustment, embodiments of the invention may employ devices such as fans, turbines, compressors or other methods of supplementing the airflow through the airflow channel when a vehicle is traveling at lower speeds or the amount of airflow required is greater than provided by the movement of the vehicle itself. Other embodiments of the invention may utilize valves or dampers to regulate the amount of airflow when circumstances require less airflow than the channel provides as a result of vehicle movement. This process is similar to a process used in artillery shells referred to as "base-bleeding" however, because artillery shells do not experience the variables that a motor vehicle must accommodate, such military applications differ significantly from what is disclosed herein.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

While a specific style of vehicle is illustrated and described herein, it is not the intention to limit the invention to only such styles of vehicle. One ordinarily skilled in the art will understand that what is described and illustrated can be applied to numerous vehicle configurations and is not limited to commercial vehicles.

Figure 1:
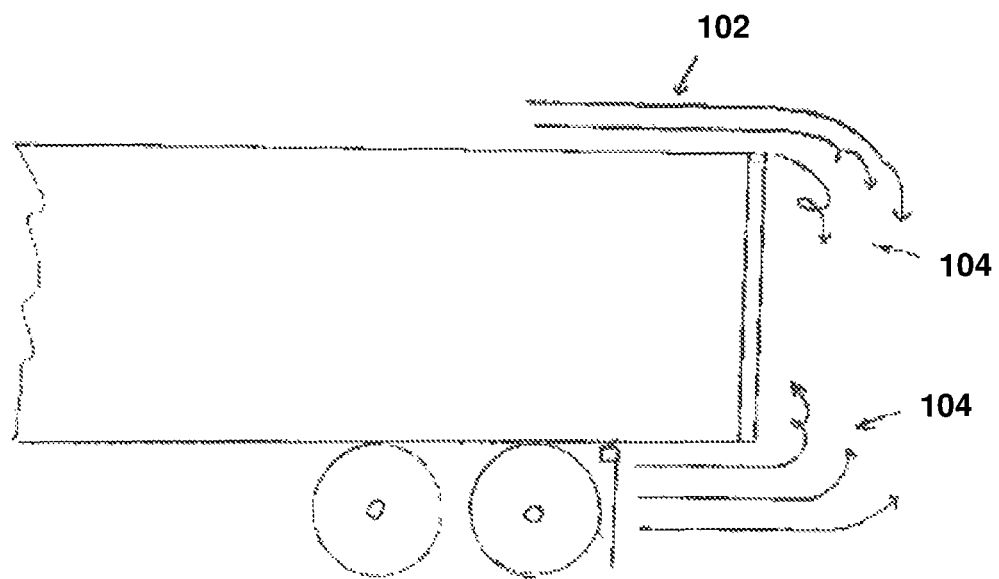
FIG. 1 is an illustration of a known freight trailer with air turbulence as the result of movement illustrated.
Figure 2:
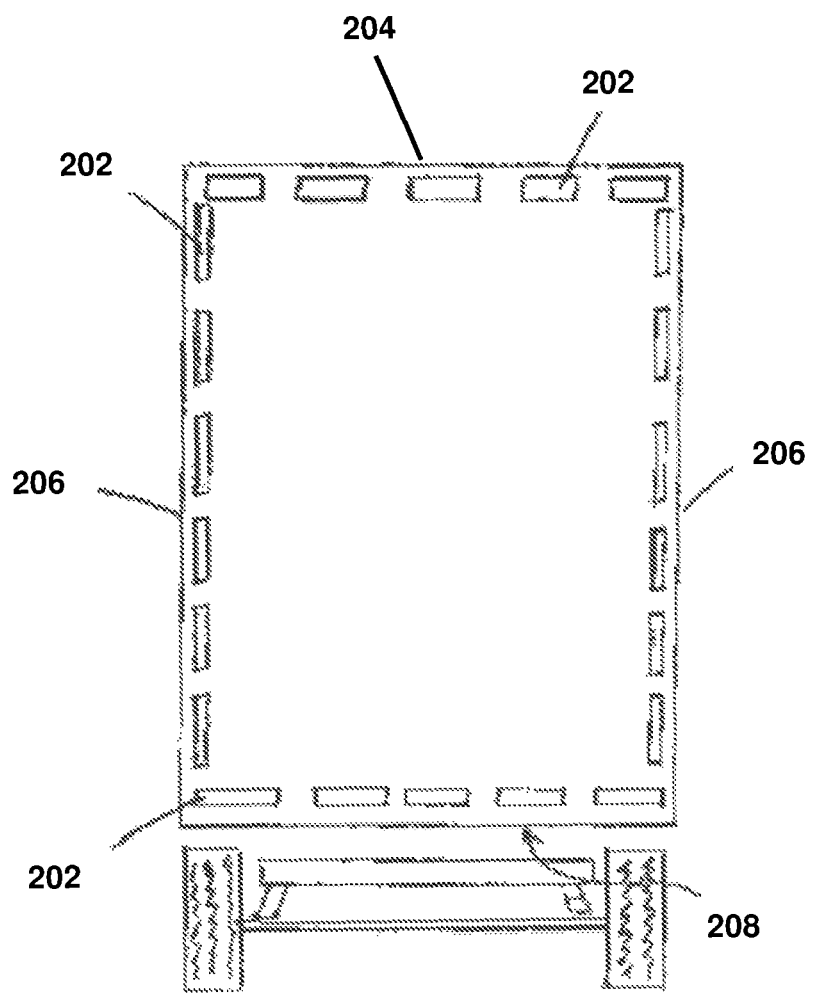
FIG. 2 is an illustration of the rear of a freight trailer showing airflow exits in an embodiment of the invention.
Figure 3:
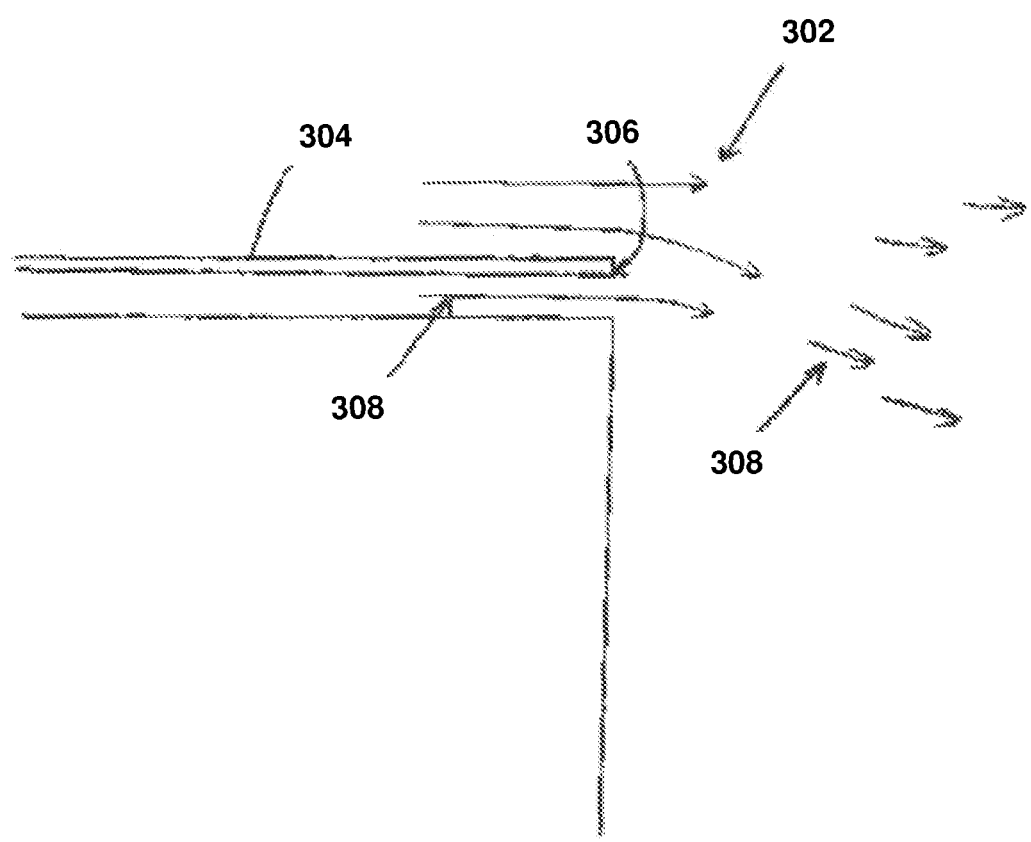
FIG. 3 is an illustration of an airflow exit in an embodiment of the invention where turbulence is lessened as the result of airflow through the embodiment of the invention.

As is illustrated in FIG. 1, in the prior art, airflow 102 would pass over the trailing edge of a vehicle moving through the air and form turbulence 104. This turbulence results in drag to the vehicle which in turn reduces the fuel efficiency of that vehicle. In order to reduce the drag resulting from turbulence that results from the sharp trailing edge of such a vehicle, an embodiment of the invention may introduce an additional air flow at a point near the trailing edges of such a vehicle. In an embodiment of the invention, a plurality of exit points may be located along the trailing edge of a vehicle where turbulence occurs. Depending upon the amount of airflow over the vehicle, the corresponding airflow may be provided via a series of rectangular, semi-rectangular, circular, oval, or other shapes as may be best configured to provide a uniform airflow along the trailing edge of the vehicle in order to minimize the effect of turbulence. An example of such a configuration is shown in FIG. 2. The illustration is a representation of the rear of a vehicle as illustrated in FIG. 1. As is illustrated, a series of openings 202 are arranged along an edge. The openings 202 may surround the trailing edges of a vehicle in such an arrangement. These openings may be located at areas of turbulence to break up an airflow as it passes over the trailing edges. Such an effect is illustrated in FIG. 3. As is shown, a first airflow 302 passes over a surface 304 until it reaches a trailing edge 306. At the trailing edge, the first airflow 302 tends to wrap over the edge, resulting in turbulence in known embodiments. As is shown, a directed airflow 308 is introduced as the first airflow 302 begins to be deflected downward. The result of this introduction is an increase in the air pressure just after the trailing edge 306. As a result, the first airflow 302 experiences less deflection than would occur in the absence of the directed airflow. In an exemplary embodiment of the invention, the openings that provide airflow to reduce turbulence may be ½ inch annular nozzles. In such an embodiment, these nozzles may be arranged to be spaced approximately 4 inches from an adjacent nozzle and oriented to be perpendicular to the fact of the vehicle. In such an embodiment, it is not required to heat or cool the airflow prior to deliver to the nozzles.

Placement of a directed airflow outlet along a trailing edge of a vehicle may thus reduce turbulence and resultant drag on the vehicle. As is illustrated in FIG. 2, a trailing edge may exist along a top edge 204, sides 206, and bottom edges 208. Because the amount of first airflow 302 that passes over each edge may be different due to the influence of factors such, but not limited to, a road surface, tires and wheels, and shape of the front of the vehicle, the amount of directed airflow may also need to be varied. In order to accomplish this variation, the path of the directed airflow may need to be adjusted. In certain embodiments of the invention, the diameter of a directed airflow channel may be adjusted by reducing the cross section of the channel 404. In other embodiments, a valve 406 may be implemented such that the airflow may be restricted along the channel or at the exit. Such a valve system may be static, in other words the valve may be adjustable by a user and then remain stationary until the user makes an additional adjustment. Alternatively, the valve may be configured to be actively controlled. In such an embodiment, the amount of turbulence or drag experienced by a vehicle may be monitored and one or more valves adjusted to optimize the airflow in order to produce the least amount of drag.

Figure 5:
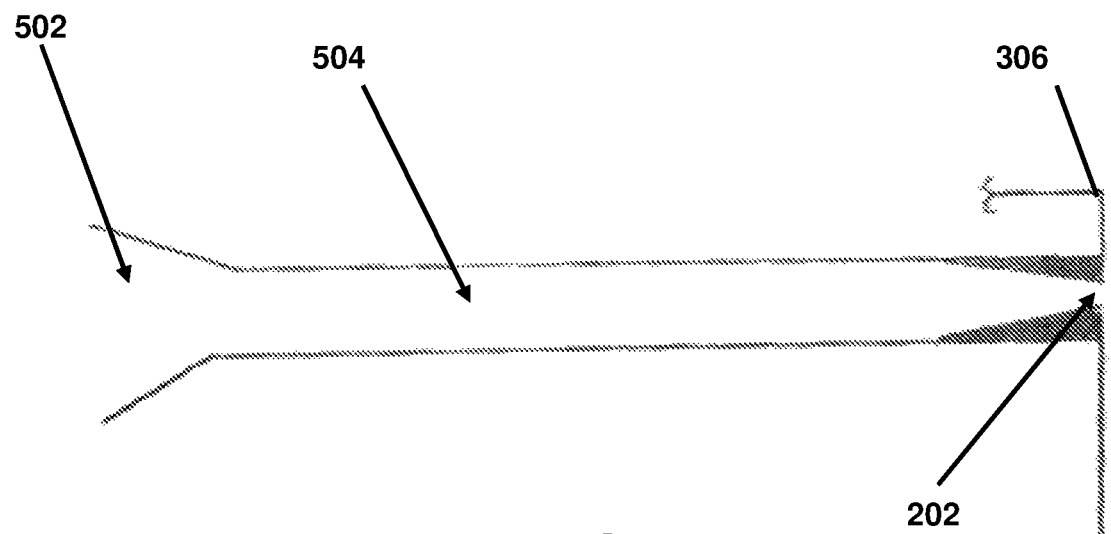
FIG. 5 is an illustration of an airflow scoop used to gather air as a vehicle employing an embodiment of the invention moves through the air.

In an exemplary embodiment of the invention, an airflow that is about 0.7% of the air that is displaced by the vehicle as it moves along the road. In embodiments of the invention, a sufficient amount of airflow may be produced by an intake located such that airflow resulting from movement of the vehicle may be directed into the airflow channel 404. An embodiment of such a configuration is illustrated in FIG. 5. As is shown, an enlarged portion of the airflow channel 502 may be located such that a stream of air enters the enlarged portion and may be directed into a narrower channel portion 504 and delivered to an exit point 202 adjacent to a vehicle trailing edge 306. Such an embodiment may produce a sufficient level of airflow to provide the desired reduction in turbulence at the trailing edge of a vehicle.

Figure 4:
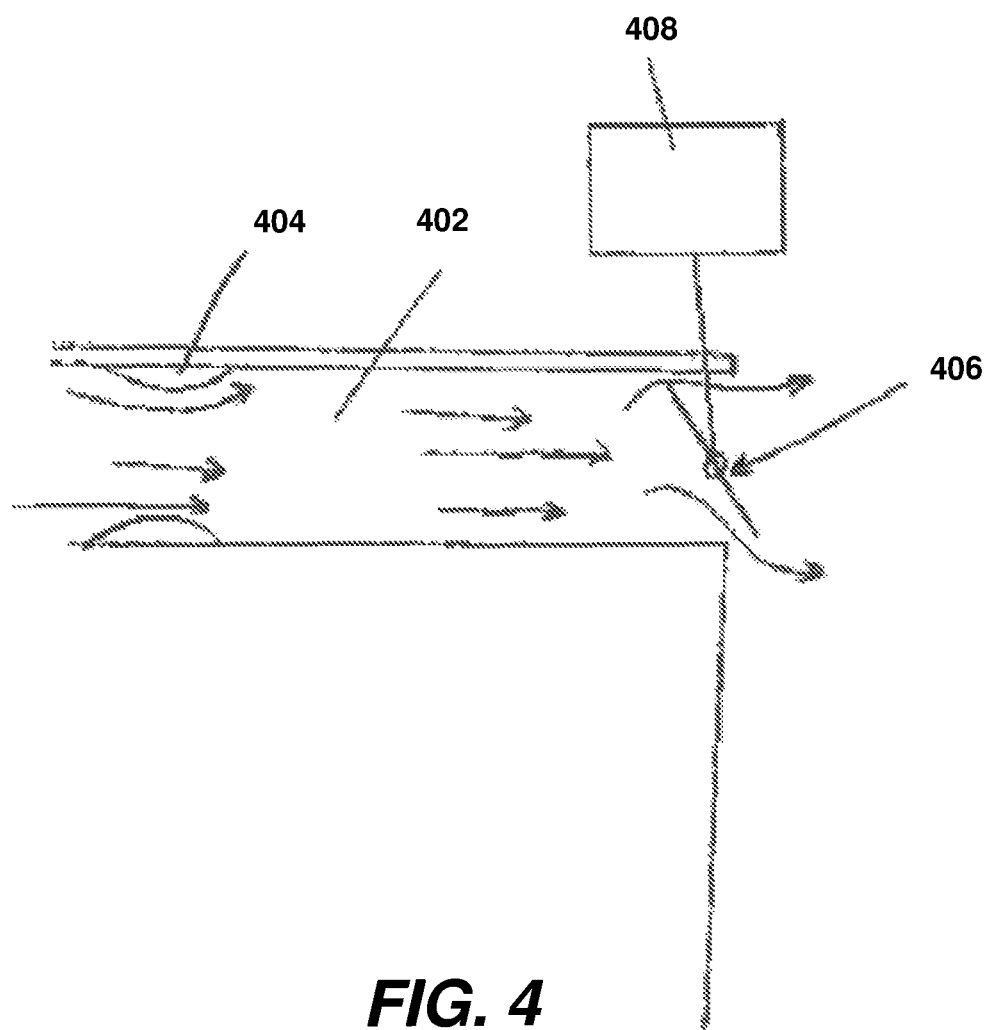
FIG. 4 is an illustration of an airflow exit in an embodiment of the invention in which a damper valve is employed to regular the airflow through the airflow exit.
Figure 6:
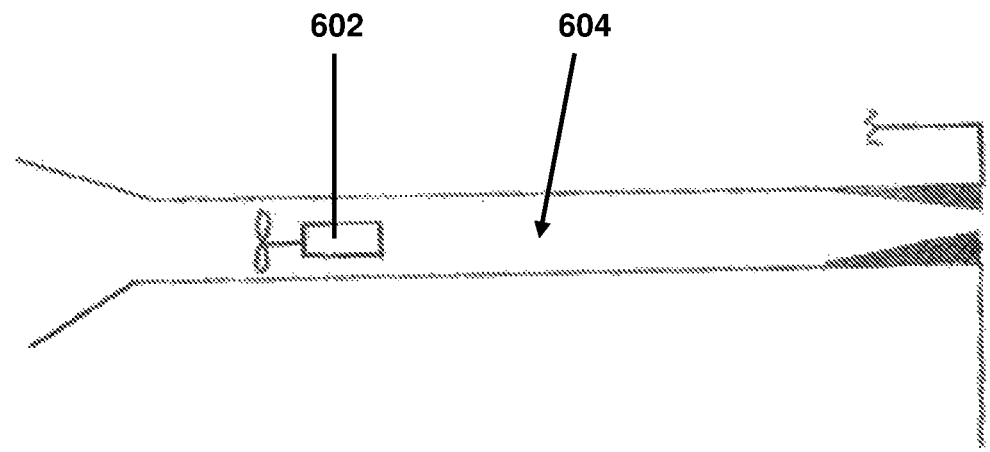
FIG. 6 is an illustration of an embodiment of the invention in which a turbine is used to increase the amount of airflow through the airflow channel.

In certain embodiments of the invention, a sufficient level of airflow may not be able to be generated by the enlarged intake illustrated in FIG. 5. This may be a result of vehicle movement characteristics or design limitations that prevent the use of enlarged intake areas. In such a circumstance, compressed gases, a fan, turbine, compressor or other means to increase the level of airflow may be used. Such an embodiment is illustrated in FIG. 6. As is shown, a turbine 602 is located in an airflow channel in an embodiment of the invention. In such an embodiment, the turbine 602 may be used to provide a greater airflow than might have been produced at a given vehicle speed in order to improve the performance of the invention in certain vehicle configurations. In addition to providing a greater airflow, in certain embodiments of the invention, the turbine 602 (compressed gas, fan, compressor, or other means for increasing the amount of airflow) may be regulated by a control system to increase or decrease the amount of airflow in order to improve the performance of the invention at a given speed and vehicle configuration. Such an embodiment may be used in conjunction with valves illustrated in FIG. 4 at 406 to further control the output of the airflow channel to optimize the reduction in turbulence resulting from use of the invention. In such embodiments, the static pressure exerted by the airflow as it moves through the airflow channel 404 may be approximately 30 pounds per square inch. In embodiments of the invention that comprise valves 406 to control the airflow amount, a controller 408 may be employed to interact with the valves 406 and in certain embodiments of the invention, may be configured to provide control to the airflow delivered by groups of 3 or 4 jets. In embodiments of the invention, control may be adjusted in intervals that range from a few seconds to periods of time that are longer, such as once per minute. In embodiments of the invention, the controller may monitor vehicle conditions such as engine speed, vehicle speed, air density, and vehicle fuel economy in order to optimize a desired vehicle characteristic. In certain embodiments of the invention, this may be fuel economy but other embodiments may be configured to optimize such factors as vehicle stability.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for reducing the drag resulting at a trailing edge of a vehicle from the turbulence of the vehicle moving through the air, the system comprising:
   a plurality of channels, arranged along at least a top surface of the vehicle, to receive airflow at a leading edge of the vehicle, contain the airflow along the length of the vehicle and discharge the airflow along the trailing edge of the vehicle, each said channel having an annular cross-section.

2. The system of claim 1, wherein the plurality of channels are positioned such that their centers are approximately 4 inches apart.

3. The system of claim 1, wherein the plurality of channels are perpendicular to the leading edge.

4. The system of claim 1, further comprising:
   at least one valve in each channel to control the amount of airflow therethrough.

5. The system of claim 4, further comprising a controller in communication with the at least one valve, the controller being adapted to receive vehicle information and provide control of the valve(s) to regulate airflow based upon the received vehicle information.

6. The system of claim 5, where the information received by the controller includes vehicle speed.

7. The system of claim 5, where the information received by the controller includes vehicle fuel consumption.

8. The system of claim 1, wherein the vehicle is a tractor trailer.

9. The system of claim 1, wherein the plurality of channels is arranged also along each of the side surfaces of the vehicle from the leading edge to the trailing edge.

10. A method of improving the performance of a vehicle comprising the steps of:
    directing an airflow caused by motion of the vehicle, along at least a top surface of the vehicle, through a plurality of channels, each said channel having an annular cross-section that contains the airflow from a leading edge of the vehicle to a trailing edge of the vehicle.

11. The method of claim 10, further comprising the step of increasing the static pressure of the airflow by passing the airflow through a pressurizing device.

12. The method of claim 10, further comprising the step of positioning at least one valve in at least one of the plurality of channels and causing the valve to regulate the flow of air through the channel.

13. The method of claim 12, where the valves are controlled by a controller which provides such control based upon a received vehicle parameter.

14. The method of claim 13, where the received vehicle parameter is a value representing the speed of the vehicle.

15. The method of claim 13, where the received vehicle parameter is a representation of the fuel consumption of the vehicle.

16. The method of claim 12, where the airflow is regulated to provide an airflow through all of the plurality of channels that is about 0.7 percent of the airflow deflected around the vehicle.

17. A system reducing the drag at a trailing edge of a tractor trailer resulting from the turbulence, the system comprising:
    a plurality of channels, each said channel having an annular cross-section, arranged along a top surface and along each of the side surfaces of the tractor trailer, to receive airflow at a leading edge of the tractor trailer and discharge the airflow along the trailing edge of the tractor trailer, wherein the channels are oriented normal to the leading edge with the channels;
    at least one valve adapted to control the airflow through the channels; and
    a controller in communication with the at least one valve, the controller configured to receive velocity information and control the at least one value to result in an airflow that is proportional to the received vehicle information.

* * * * *